US012106113B2

(12) United States Patent
Verma et al.

(10) Patent No.: US 12,106,113 B2
(45) Date of Patent: Oct. 1, 2024

(54) MANAGING DEPLOYMENT MODEL MIGRATIONS FOR ENROLLED DEVICES

(71) Applicant: VMWARE, INC., Palo Alto, CA (US)

(72) Inventors: Gaurav Verma, Bangalore (IN); Ashok Kumar, Bangalore (IN); Abhijeet Padole, Bangalore (IN); Amogha Varsha Annegowda, Bangalore (IN); Karthikeyan Palanisamy, Bangalore (IN)

(73) Assignee: Omnissa, LLC, Palo Alto, CA (US)

( * ) Notice: Subject to any disclaimer, the term of this patent is extended or adjusted under 35 U.S.C. 154(b) by 120 days.

(21) Appl. No.: 17/191,835

(22) Filed: Mar. 4, 2021

(65) Prior Publication Data

US 2022/0229666 A1    Jul. 21, 2022

(30) Foreign Application Priority Data

Jan. 18, 2021    (IN) .............................. 202141002308

(51) Int. Cl.
| | |
|---|---|
| G06F 9/38 | (2018.01) |
| G06F 9/4401 | (2018.01) |
| G06F 9/445 | (2018.01) |
| G06F 9/54 | (2006.01) |
| G06K 7/14 | (2006.01) |
| H04W 4/50 | (2018.01) |

(52) U.S. Cl.
CPC .......... *G06F 9/3836* (2013.01); *G06F 9/4401* (2013.01); *G06F 9/541* (2013.01); *G06K 7/143* (2013.01)

(58) Field of Classification Search
CPC ............... G06F 9/4401; G06F 9/44505; G06F 9/3836; G06F 9/541; H04W 4/50; G06K 7/143
USPC ...................................................... 712/217
See application file for complete search history.

(56) References Cited

U.S. PATENT DOCUMENTS

| | | | | |
|---|---|---|---|---|
| 7,707,573 | B1* | 4/2010 | Marmaros ................. | G06F 8/61 717/121 |
| 10,045,174 | B1* | 8/2018 | Rao ......................... | H04W 4/50 |
| 2014/0018132 | A1* | 1/2014 | Hong .................... | H04W 52/027 455/566 |
| 2014/0053126 | A1* | 2/2014 | Watson ..................... | G06F 8/30 717/102 |
| 2015/0178063 | A1* | 6/2015 | Narkinsky .............. | G06F 8/658 717/168 |
| 2015/0248282 | A1* | 9/2015 | Zamir ..................... | H04W 4/60 717/171 |

(Continued)

*Primary Examiner* — Chun Kuan Lee
(74) *Attorney, Agent, or Firm* — Kim & Stewart LLP

(57) ABSTRACT

Disclosed are various embodiments for managing deployment model migrations for enrolled devices. A client application can transmit a capability status to a management service in an instance in which a plurality of device conditions of the client device are validated. The client application can obtain and execute instructions that cause the client application to manage a migration of the client device from a first configuration to a second configuration. A user interface can be pinned on a display of the client device in an instance in which an enterprise environment endpoint is identified and a migration interface on the client device executed. The client application can transmit samples of device conditions of the second configuration of the client device to the management service.

20 Claims, 5 Drawing Sheets

(56) References Cited

U.S. PATENT DOCUMENTS

| | | | |
|---|---|---|---|
| 2018/0114398 A1* | 4/2018 | Cho | A63F 13/533 |
| 2018/0146046 A1* | 5/2018 | Deane | H04L 41/22 |
| 2018/0316574 A1* | 11/2018 | Verma | H04L 67/34 |
| 2022/0100831 A1* | 3/2022 | Moreno | H04L 63/102 |

* cited by examiner

MANAGING DEPLOYMENT MODEL MIGRATIONS FOR ENROLLED DEVICES

RELATED APPLICATIONS

Benefit is claimed under 35 U.S.C. 119(a)-(d) to Foreign Application Serial No. 202141002308 filed in India entitled "MANAGING DEPLOYMENT MODEL MIGRATIONS FOR ENROLLED DEVICES", on Jan. 18, 2021, by VMware, Inc., which is herein incorporated in its entirety by reference for all purposes.

BACKGROUND

Smartphones and other devices running operating systems that provide administrative management capabilities have become ubiquitous and essential to users, both for personal and enterprise uses. Management services provide the ability to remotely manage or administer devices that are enrolled with the management service as a managed device.

Various original equipment manufacturers (OEMs) can provide management capabilities that are embedded into the platform, operating system, or operating system variant installed by the OEM on their respective devices. These management capabilities are often layered atop the management capabilities provided by the operating system.

For some time, Android® has provided an Application Programming Interface (API) known as Device Administrator (or "Device Admin") to support management of mobile devices. Some versions of Android® offer management functionality through a managed device ("Device Owner") and/or work profile ("Profile Owner") configuration. For example, Android Enterprise™ is a framework provided by the Android® operating system that allows a user to enroll his or her device with a management service so that the device, or at least certain portions or certain data partitions on the device, can be managed by administrators of the management service in a "Work Managed" mode.

In an enterprise environment, migrations away from "Device Admin" can result in loss of administrator control of those devices. Migrations to "Work Managed" mode can require the device to be factory reset, resulting in potential for loss of data, security risks associated with an unpatched operating system, or other drawbacks. With the rapid deprecation of Device Administrator functionality in Android®, it can be important to provide administrators with as many tools as possible to make the switch to Android® Enterprise simpler.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
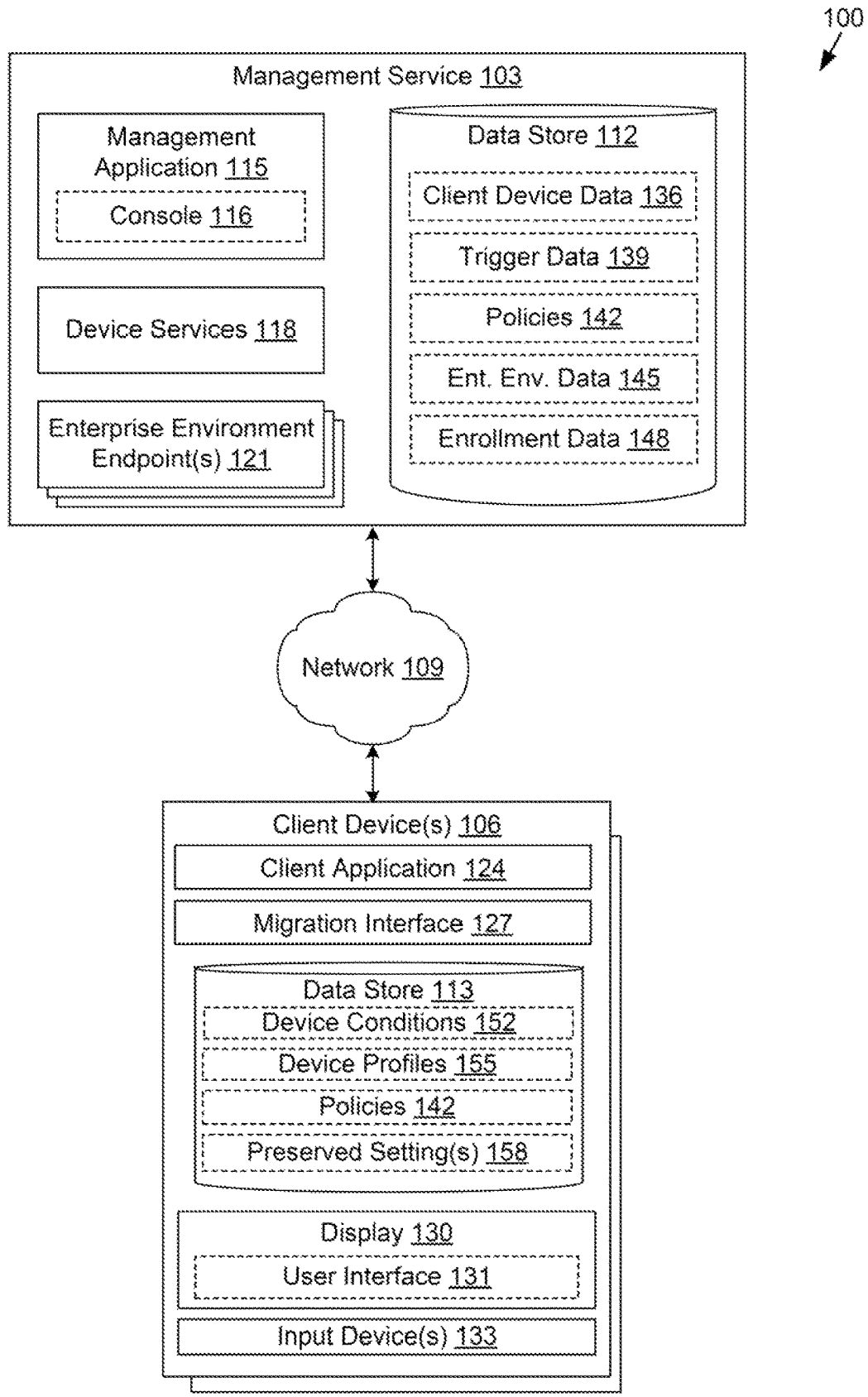
FIG. 1 is a drawing of a network environment according to various embodiments of the present disclosure.

Disclosed are various examples of systems that manage deployment model migrations for enrolled devices. Users of an enterprise can be issued devices or allowed by the enterprise to use their personal devices to access enterprise resources, such as a corporate network, email, documents, contacts, and other resources. Additionally, an enterprise might have a library of applications that are available for use by its users to access certain data.

In an enterprise environment, client devices can be enrolled with a management service that provides a management application the enterprise uses for managing the capabilities and behaviors of the devices. A client application can be installed on a client device so the device can be locally managed by the client application and remotely managed by the management service.

Google® announced the deprecation of Device Administrator on the Android® Operating System, which could result in loss of administrator control of those devices via a configuration for Device Administrator mode. This can be a significant problem for enterprises who have client devices running on Device Administrator.

Android® Enterprise can provide a standardized mode of management for company owned, personal, or corporate-owned personally-enabled (also known as COPE) devices. It can be preferable for management services to allow users to migrate their devices without bringing the devices back to Information Technology (IT) administrators. It can also be preferable to have the device in a fully managed mode (e.g., Corporate Dedicated mode which in some instances is known as Work Managed mode) in Android® Enterprise. Registration for Android® Enterprise Work Managed mode can require the device to be factory reset, resulting in potential for loss of data, security risks associated with an unpatched operating system, or other drawbacks. With the rapid deprecation of Device Administrator functionality in Android®, it can be important to provide administrators with as many tools as possible to facilitate the migration to Android® Enterprise.

Disclosed herein are approaches for migrating a client device from a first configuration (e.g., Device Administrator mode) to a second configuration (e.g., Android® Enterprise Work Managed mode). A management service can determine a trigger point for a migration to the second configuration, and generate a trigger entity associated with instructions that can cause the client device to perform the migration. For example, a command, a Quick Response (QR) code, or a file associated with an Android® intent can trigger the migration. A client application executable by the client device can manage the migration and report status back at various points to the management service. Following the migration, the client device can be enrolled with the management service as a managed device allowing the client device to be locally managed by the client application or remotely managed by the management service. The approaches disclosed herein can be OEM-agnostic meaning they can migrate client devices that may have different versions or types of OEM-provided migration interfaces. The approaches can be used to migrate client devices while suppressing power offs, reboots, resets, or other actions that could affect the migration. The approaches can also preserve profiles, settings, or attributes that facilitate use of the client device within the enterprise. In the following discussion, examples of systems and their components are described, followed by examples of the operation of those systems.

With reference to FIG. 1, shown is a network environment 100 according to various embodiments. The network environment 100 includes a management service 103 and one or more client device(s) 106 which are in data communication with each other via a network 109. The network 109 can include the internet, intranets, extranets, wide area networks (WANs), local area networks (LANs), wired networks, wireless networks, or other suitable networks, etc., or any combination of two or more such networks 109. For example, such networks 109 can comprise satellite networks, cable networks, Ethernet networks, and other types of networks.

The management service 103 can include a server computer or any other system providing computing capability. Alternatively, the management service 103 can include a plurality of computing devices that are arranged, for example, in one or more server banks, computer banks, or other arrangements. The management service 103 can include a grid computing resource or any other distributed computing arrangement. The computing devices can be located in a single installation or can be distributed among many different geographical locations. The management service 103 can also include or be operated as one or more virtualized computer instances. For purposes of convenience, the management service 103 is referred to in the singular. Even though the management service 103 is referred to in the singular, it is understood that a plurality of management services 103 can be employed in the various arrangements as described above.

The client device 106 is representative of any one or more client devices 106 that can be coupled to the network 109, such as a desktop computer, a laptop computer, personal digital assistants, cellular telephones, smartphones, set-top boxes, web pads, tablet computer systems, or other devices with like capability.

Applications or other functionality can be executed in the network environment 100 according to examples. Also, data can be stored in a data store 112 and a data store 113 that can be accessible to the management service 103 and the client device 106, respectively. The data store 112 or the data store 113 can be representative of a plurality of data stores 112 or data stores 113. The data stored in the data store 112 or the data store 113 can be associated with the operation of the applications or functional entities as further described below.

In operation, the management service 103 can execute a management application 115, device services 118, one or more enterprise environment endpoint(s) 121, and other applications, services, processes, systems, engines, or functionality not discussed in detail herein. In some examples, an enterprise, such as one or more organizations, can operate the management service 103 to oversee or manage the operation of the client devices 106 of its employees, contractors, customers, students, or other users having user accounts with the enterprise.

The client device 106 can execute a client application 124, a migration interface 127, and other applications, services, processes, systems, engines, or functionality not discussed in detail herein. The client device 106 can include output devices such as audio speakers and a display 130 upon which user interface(s) 131 generated by the client application 124, the migration interface 127, or another application can be rendered. The display 130 can include liquid crystal display (LCD) displays, gas plasma-based flat panel displays, organic light emitting diode (OLED) displays, electrophoretic ink (E-ink) displays, LCD projectors, or other types of display devices, etc.

The client device 106 can include one or more input devices 133, such as a mouse, keyboard, touch pad, or touch screen, which facilitate a user interacting with the client application 124 or controlling the client device 106. The input devices 133 can include one or more input sensors to capture and encode images, sounds, or other information for processing by the client device 106. To this end, the input sensors may include, for example, a camera capable of capturing still-frame images, video, or other visual data.

Returning to the management service 103, the management application 115 of the management service 103 can manage deployment model migrations for client devices 106 that are enrolled with the management service 103 as managed devices. The management application 115 can also generate a console 116 or other user interface that can allow administrators and other users to operate and interact with the management service 103.

A deployment model can refer to a configuration for management of the client device 106 associated with the Chrome OS™ operating system, Android®, Android® for Work (or Android® Enterprise), Google Play™ for Work, or Work Profiles by Google™, among other examples. In some instances, the managed device is a bring-your-own-device (BYOD) or corporate-owned personally-enabled (also known as COPE) device that can be managed by a Work Profile on the managed device. The configuration(s) described herein can include a first configuration for Android® Device Admin, a second configuration for Android® Enterprise Work Managed mode, any other configuration for an Android® device, or other suitable configurations for a mobile device.

The management application 115 can cause various software to be installed on the client device 106. Software can include the client application 124, the migration interface 127, an operating system or operating system updates, resources, libraries, drivers, or other similar components that are executable on the client device 106.

The management application 115 can also cause capabilities or behaviors to be managed on the client device 106. The management application 115 can enforce policies related to the capabilities or behaviors by way of implementing a device profile on the client device 106. Policies can include, for example, restrictions or permissions pertaining to capabilities of the client device 106 such that, access to enterprise data is secured on the client device 106. Policies can also include restrictions or permissions about behaviors of the client device 106 that can facilitate access to enterprise data or applications in the enterprise environment.

In some examples, the management application 115 can determine a trigger point for a deployment model migration for the client device 106. The trigger point can be related to a migration interface 127 associated with an OEM of the client device 106. The management application 115 can publish a trigger entity to the client device 106 that is associated with one or more instructions executable by the client device for performing a migration for the client device 106 away from a current configuration of the client device 106. Examples of the trigger entity can include a command, a Quick Response (QR) code, a file associated with an Android® Intent, or other suitable entity for publishing to the client device 106 and triggering a migration.

In examples of some aspects, the management application 115 can communicate with the client devices 106 through use of the device services 118. The device services 118 can provide a command queue or other processes involved in receiving from and transmitting to the client devices 106. The management application 115 can store commands and other suitable content in the command queue associated with a particular client device 106 and can trigger a migration for the client device 106 from a first configuration to a second configuration. In some other examples, the command queue can be stored in the data store 112.

The client application 124 executed by such client device 106 can retrieve the contents of the command queue via the device services 118. The client device 106 can execute the instruction(s) to perform the migration for the client device 106 away from a current configuration. In some examples, executing the instruction(s) can involve the migration for the client device 106 from a first configuration to a second configuration. The client application 124 can also be executed to report status (before, during, and after the migration) to the management service 103. If the migration fails, the client application 124 can retain its previous state of the first configuration (e.g., Device Administrator).

The enterprise environment endpoint(s) 121 can be an instantiation of an application, service, or other functionality that supports one or more of the various deployment model configurations which are possible for the client devices 106. In some aspects, each of the enterprise environment endpoints 121 can be associated with a particular enterprise environment of a customer, or a server within the customer's enterprise environment. The enterprise environment endpoint(s) 121 can for example be configured with a version of Android® Enterprise.

The migration interface 127 can provide an Application Programming Interface (API), service, or other mechanism to enable a configuration for Android® Enterprise Work Managed mode, or other configuration associated with a particular deployment model provided by an OEM. The migration interface 127 can be an XML-based communication framework, such as the MX API (The MX Management System (MXMS) or "MX API") from Zebra Technologies Corp. of Lincolnshire, IL, that provides a common interface for managing the capabilities and behaviors of Android® devices.

In some aspects, the migration interface 127 can provide a Uniform Resource Identifier (URI) or other type of a resource identifier for an interface that migrates the client device 106 to a configuration suitable for the client device 106 to be locally managed by the client application 124 or remotely managed by the management service 103 (e.g., as the "Device Owner" under Android® Enterprise). The client application 124 can also cause a registration for Android® Enterprise Work Managed mode to be performed.

The data stored in the data store 112 within the management service 103 can include client device data 136, trigger data 139, policies 142, enterprise environment data 145, enrollment data 148, and potentially other data. Client device data 136 can include indications of the state of the client device 106. In one example, these indications can specify applications that are installed on the client device 106, configurations or settings that are applied to the client device 106, user accounts associated with the client device 106, the physical location of the client device 106, the network to which the client device 106 is connected, and other information describing the current state of the client device 106. In other examples, the client device data 136 can include a serial number, a media access control (MAC) address of a network interface card (NIC), manufacturer information, a Personal Identification Number (PIN) setup status, a status of Bluetooth®, camera or microphone functionality, or other information about the client device 106.

The trigger data 139 can include data about one or more trigger points for migrating a deployment model for a managed device. In some examples, the trigger point can be related to an OEM of the client device 106 being determined to be Zebra Technologies Corp. of Lincolnshire, IL, the OEM being determined to be Honeywell International Inc. of Charlotte, NC, or the trigger point can be related to a particular migration capability reported by the client device 106. In some aspects, the trigger data 139 can include data that can be included in a command or a file, or encoded as a QR code.

The trigger data 139 can include a migration certificate, a resource identifier of the migration interface 127, application information, or migration event information. For example, the migration certificate can be an X.509 public key certificate or other certificate that can be installed on the client devices 106 to permit the devices to migrate from Device Admin Mode to Work Managed mode. The trigger data 139 can also include a Uniform Resource Locator (URL) or other locator of the enterprise environment endpoint 121.

The policies 142 can include data about policies that can be enforced by the management service 103 or the client application 124. For example, the policies 142 can identify user-specific or device-specific policies that are associated with a particular client device 106, such as policies that are related to the location of the client device 106, network settings of the client device 106, applications that are installed on the client device 106, or any capabilities or behaviors of the client device 106.

The enterprise environment data 145 can include data about the one or more enterprise environment endpoint(s) 121, such as a version of at least one of: an operating system or a platform of the enterprise environment endpoint(s) 121, and a Uniform Resource Locator (URL) or other locator of the enterprise environment endpoint(s) 121. The enrollment data 148 can include data about enrollment of the client device 106 as a managed device applicable for any deployment model configuration, e.g., a first configuration for Android® Device Admin or a second configuration for Android® Enterprise Work Managed mode. The enrollment data 148 data can indicate that the client device 106 has been enrolled with the management service 103 as a managed device under the Android® Enterprise Work Managed mode.

The data stored in the data store 113 within the client device 106 can include device conditions 152, one or more device profiles 155, policies 142, one or more preserved settings 158, and potentially other data. The device conditions 152 can include data about conditions of the client device 106 applicable to a migration to one or more deployment models. The device conditions 152 can indicate that the client device 106 is currently enrolled according to an Android® Device Admin configuration. The device conditions 152 can include, for example, data about versions, applications, or device settings of the client device 106.

The device conditions 152 can include a version of an operating system or a platform of the client device 106, a battery status, a version of the client application 124, an identifier of the migration interface 127, or a lack of presence of a type of a user account on the client device 106. The version can indicate a version of the Android® operating system that is supported for a migration to Android® Enterprise Work Managed mode. The battery status can indicate a current battery level and charging state of the client device 106. The identifier of the migration interface 127 can indicate a supported version of an Application Programming Interface (API) provided by an OEM is installed on or executable by the client device 106. The lack of presence of a type of a user account on the client device 106 can indicate that no Google®, Exchange™ or other types of user account available on mobile devices are installed.

The device profiles 155 can include data about hardware and software attributes of the client device 106 to be locally managed by the client application 124 or remotely managed by the management service 103. In some aspects, the device profiles 155 can also be specific to a configuration of a deployment model such as Android® Device Admin or Android® Enterprise Work Managed mode. The preserved settings 158 can include data about WiFi settings, Virtual Private Network (VPN) settings, proxy settings, WiFi credentials or other credentials, certificates, single sign-on profiles, email profiles, or other profiles, settings, or attributes to be preserved during the migration.

Figure 2:
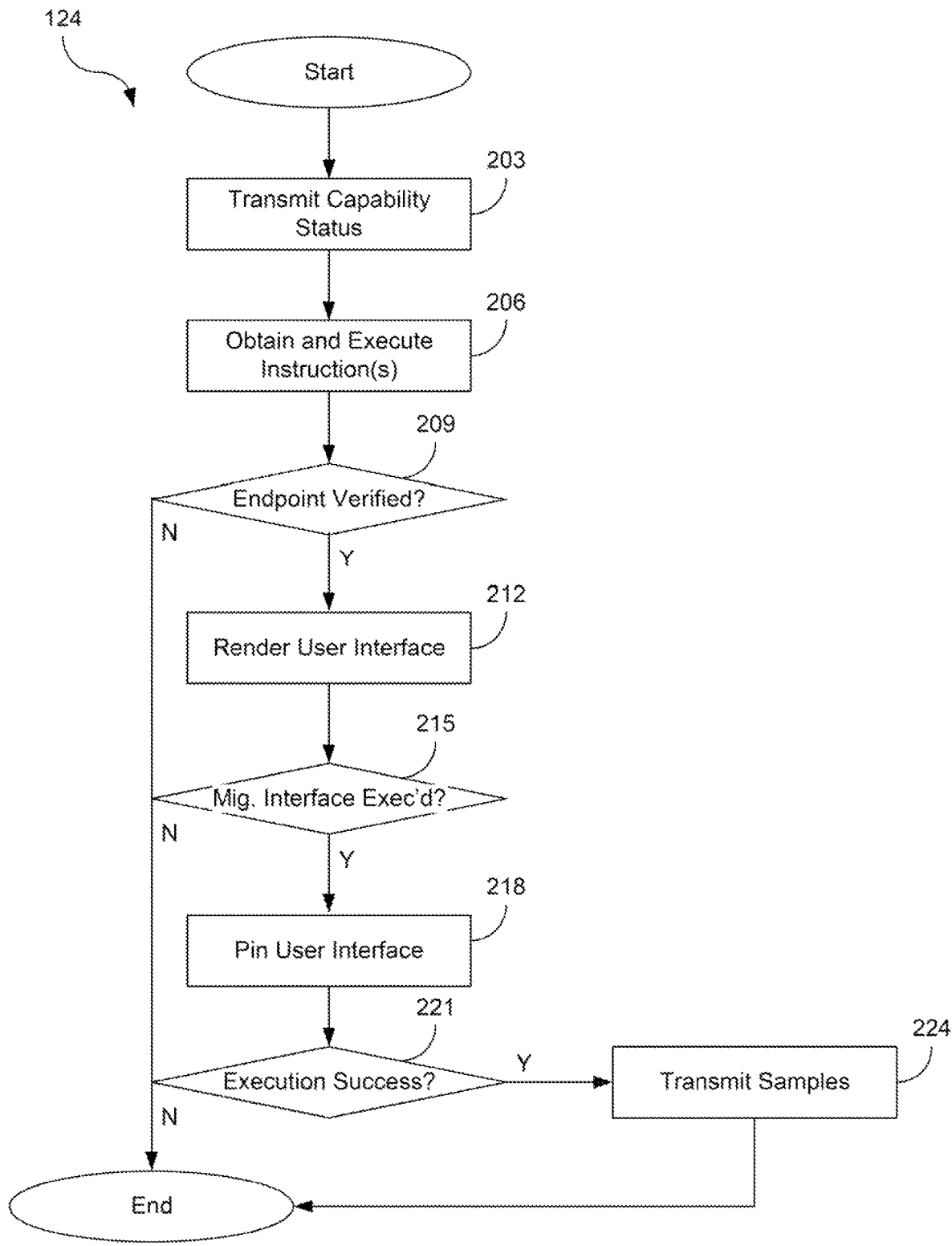
FIG. 2 is a flowchart illustrating one example of the functionality provided by a client application as executed in the network environment of FIG. 1.

Next, examples of the operation of the network environment 100 are described in further detail. FIG. 2 is a flowchart illustrating one example of the functionality provided by the client application 124 as executed in the network environment 100 of FIG. 1.

Beginning at box 203, the client application 124 can transmit a capability status to the management service 103. In some instances, the client application 124 validates a plurality of device conditions 152 to perform a precheck applicable to a migration to one or more deployment models. The device conditions 152 can include a version of an Application Programming Interface (API) (e.g., Device Admin) that is installed on or executable by the client device 106, a version of an operating system or a platform of the client device 106, a battery status, a version of the client application 124, an identifier of the migration interface 127, or a lack of presence of a type of a user account on the client device 106.

The client application 124 can transmit the capability status in an instance in which one or more of the plurality of device conditions 152 of the client device 106 are validated to be greater than a specified threshold version that are supported for the migration. For example, the capability status can be transmitted in an instance in which the plurality of device conditions 152 are validated to include a version of the Android® operating system that is supported for a migration to Android® Enterprise Work Managed mode. As such, the client application 124 can transmit the capability status to indicate that the client application 124 is capable to perform the migration to a configuration for Android® Enterprise Work Managed mode. The capability status can be a Boolean key value pair such as "'migration.eligible'=TRUE" that indicates the client device 106 is eligible for the migration. In further examples, the client application 124 can transmit the capability status when the identifier of the migration interface 127 indicates a supported version of an Application Programming Interface (API) provided is installed on or executable by the client device 106.

The client application 124 can transmit the capability status when a version of a Device Admin API that is installed on or executable by the client device 106 is greater than or equal to a specified threshold of API version, a version of an Android® operating system of the client device 106 is greater than or equal to a specified threshold of operating system version, a current battery percentage of the client device 106 is greater than a specified threshold of battery percentage (e.g., 20 percent), a version of the client application 124 is greater than or equal to a specified threshold of client application version, or a version of the migration interface 127 is greater than or equal to a specified threshold of migration interface version. In some examples, the client application 124 can transmit the capability status when no Google® accounts are installed on the client device 106.

At box 206, the client application 124 can obtain at least one instruction. In some examples, the at least one instruction comprises the client application 124 causing the client device 106 to receive a command from the device services 118 of the management service 103. The instruction can include trigger data 139 comprising at least one of: a migration certificate, a resource identifier of the migration interface 127, application information, migration event information, or a locator of an enterprise environment endpoint 121. The instruction can be received in an instance in which the client device 106 is determined to be eligible for the migration based at least in part on the eligibility status transmitted at box 203. The client device 106 can execute the at least one instruction to perform the migration.

The instruction, when executed, can cause the client device 106 to (among other things as shown in FIG. 2) perform the migration in an instance in which a version of the enterprise environment endpoint 121 is identified. For example, the version can be of at least one of: an operating system or a platform of the enterprise environment endpoint 121 that is a version of Android® Enterprise.

In one example, the instruction can be a command configured to be executed by the client device 106 to cause the client device 106 to perform a migration of the client device from a first configuration to a second configuration. The client device 106 can receive the instruction or the command, set a status to "Migration In Progress," and transmit the status to the management service 103.

In another example, the instruction can be associated with a Quick Response (QR) code. A QR code generated based at least in part on the trigger data 139 can, when scanned by the client application 124, trigger the migration. The QR code can comprise a migration certificate, a resource identifier of the migration interface 127, application information, or migration event information. In some cases, the client application 124 can install the migration certificate on the client device 106. If the client device 106 is eligible for migration, the client application 124 can enable a scanning functionality of an input sensor of the input device 133. Scanning the QR code via the input device 133 of the client device 106 can initiate the migration. A user of the client device 106 may prefer to scan the QR code to trigger the migration at an appropriate time.

In another example, the instruction can be associated with a file comprising an Android® intent that can trigger the migration. The client application 124 can provide Android® Intent execution on the client device 106 that is configurable via the console 116 rendered by the management application 115. An administrator user can use the console 116 to create a Manifest file with the Intents, which can be associated with the migration interface 127 and executed on the client device 106. These intents can be used to execute any functionality of the operating system of the client device 106. In some aspects, the administrator user can use the console 116 to create a "File Action," which can cause the client application 124 to receive one or more file(s) and store the file(s) in a specified location on the client device 106. The specified location can be configured by the administrator user to be a path on the client device 106 that is designated by the OEM to be associated with the migration interface 127.

The client application 124 can receive a "DeviceConfig" file or any other file to be stored in the specified location on the client device 106. In some examples, the DeviceConfig file can contain the intent information along with the filename, path to store, intent type, or other information. The client application 124 can check an "Intent value" to determine whether it is a migration intent for the particular OEM of the client device 106.

At box 209, the client application 124 can determine whether the version of the enterprise environment endpoint 121 has been identified or verified as a supported version for the migration. In an instance in which the version has been identified or verified, the process can proceed to box 212. Otherwise, the client application 124 can report to the management service 103 a status of "Migration Failed," or the process can otherwise proceed to completion.

At box 212, the client application 124 can render the user interface 131 on the display 130 of the client device 106. The user interface 131 can come to the foreground of the display 130 and render an indication of the status (e.g., "Migration In Progress") along with "do's and don'ts" for the user like "Do not disconnect power to the device."

At box 215, the client application 124 can determine whether the migration interface 121 has been executed. For example, the instruction can cause the client application 124 to invoke a call to the migration interface 127 to convert the client device 106 from a first configuration to a second configuration. By executing the call to the migration interface 127, the client application 124 can initiate the migration to the second configuration (e.g., Android® Enterprise Work Managed mode).

In an instance in which the migration interface 127 on the client device 106 is executed to perform the migration of the client device 106 from the first configuration to the second configuration, the client application 124 can, at box 218, pin the user interface 131 to the foreground of the display 130. Causing the client device 106 to pin the user interface 131 can include causing the user interface 131 to be maintained in the foreground, thereby excluding a user from interacting with other applications on the client device 106. Pinning the user interface 131 can include disabling buttons (Home, Back, Recent, etc.) or other navigation elements within the client application 124 that could affect the migration.

At box 221, the client application 124 can determine whether execution of the migration interface 127 was successful. For example, the client application 124 can receive an indication of success from the migration interface 127 following the call to the migration interface 127 described above regarding box 215. Or, the client application 124 can query the migration interface 127 or the device conditions 152 to determine that execution of the migration interface 127 for the migration to the second configuration was successful. If execution of the migration interface 127 was successful, the process can proceed to box 224. Otherwise, the process can proceed to completion.

In an instance in which it is determined that execution of the migration interface 127 was successful, the client device 106 can transmit, at box 224, samples of device conditions 152 of the second configuration of the client device 106 to the management service 103. The device conditions 152 can include data about hardware and software attributes of the client device 106 applicable to the second configuration, e.g., Android® Enterprise Work Managed mode. The samples can also be associated with data about hardware and software attributes of the client device 106 that allow the client device 106 to be locally managed by the client application 124 or remotely managed by the management service 103 according to the device profiles 155. Thereafter, the process can proceed to completion.

Figure 3A:
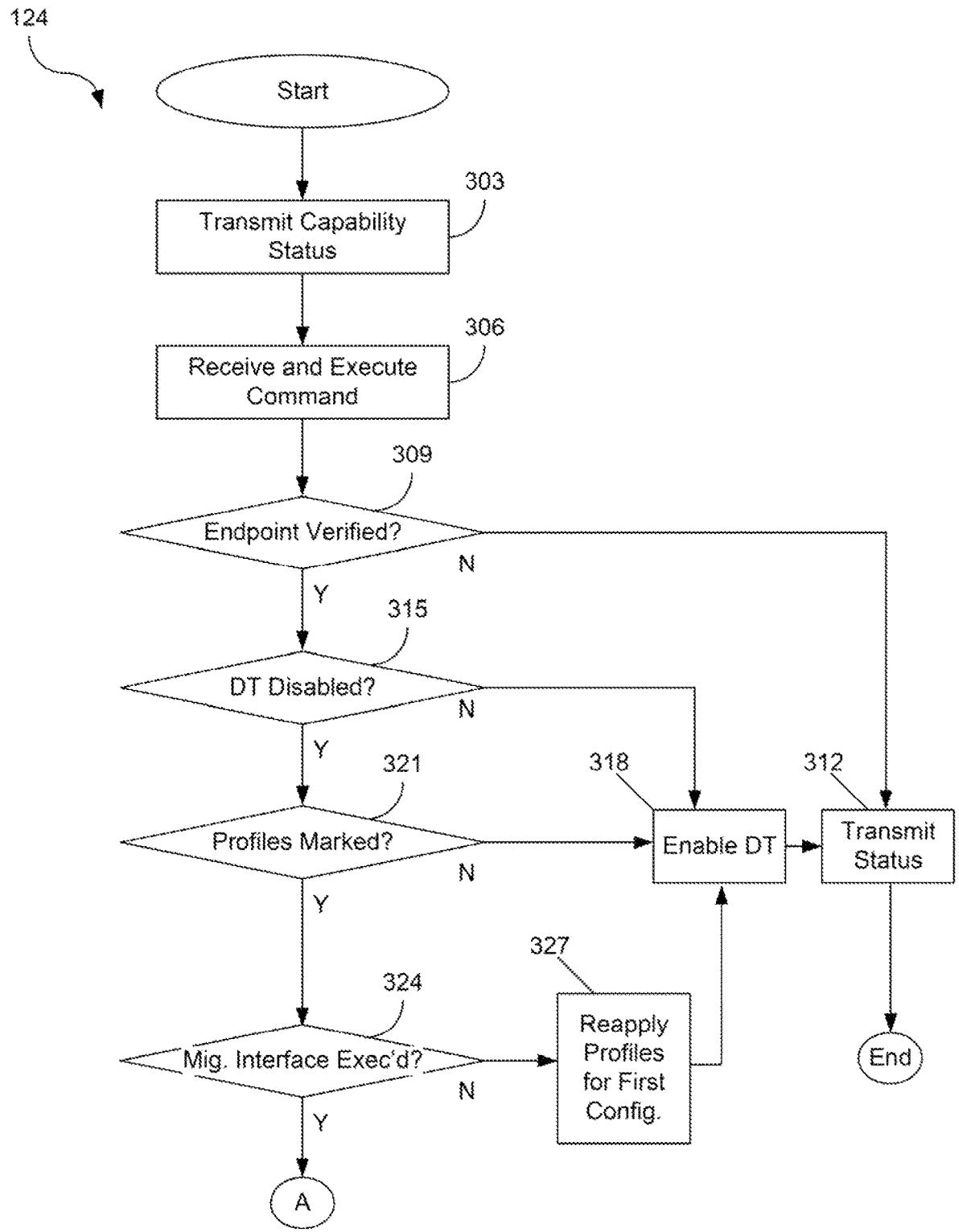
FIGS. 3A and 3B are flowcharts illustrating alternative examples of the functionality provided by the client application as executed in the network environment of FIG. 1.
Figure 3B:
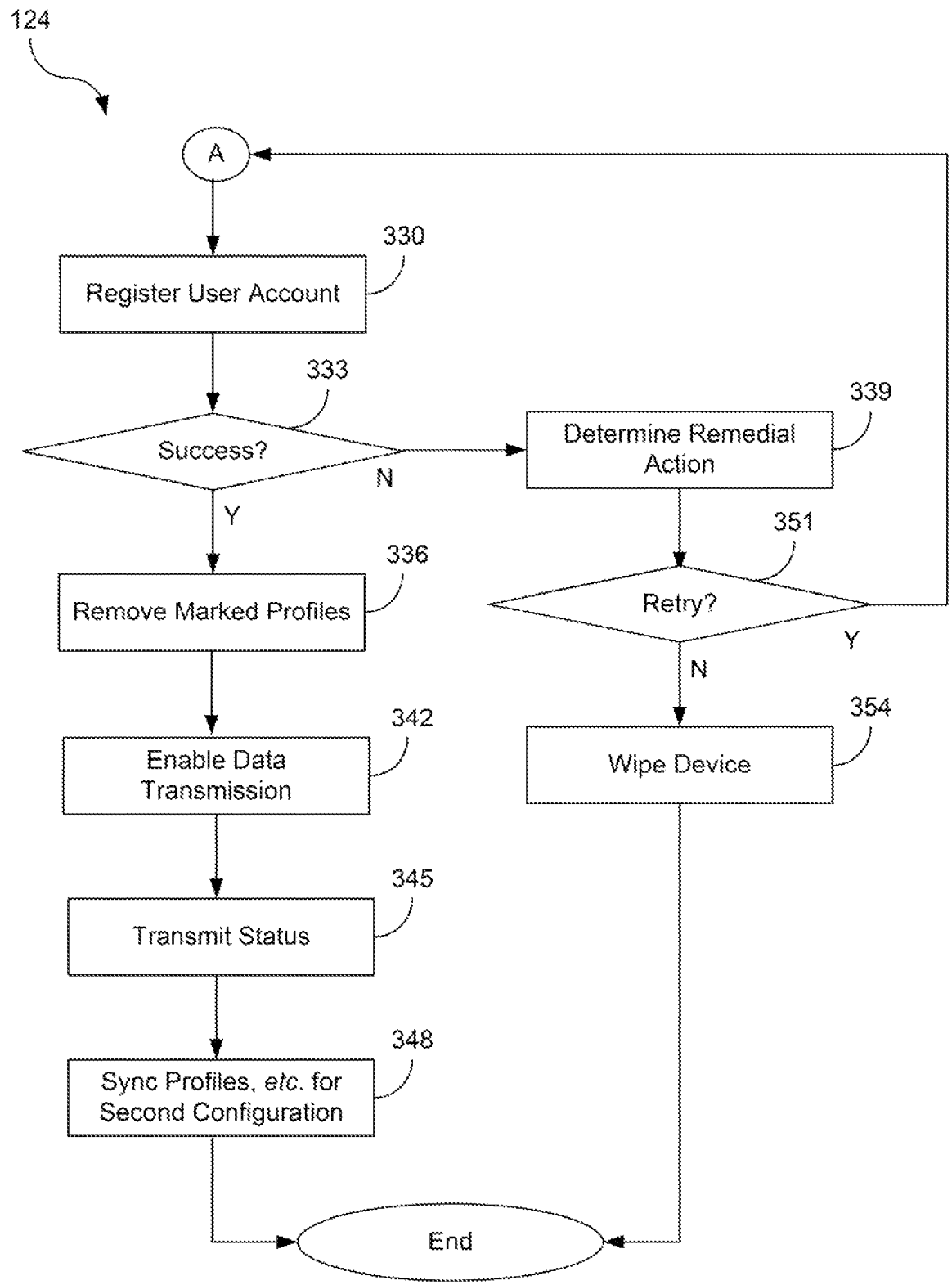

Turning to FIGS. 3A and 3B, shown are flowcharts illustrating alternative examples of the functionality provided by the client application 124 as executed in the network environment 100 of FIG. 1. At box 303, the client application 124 can transmit a capability status to the management service 103. The capability status may be sent to be stored in the data store 112 as a custom attribute associated with the client device 106.

At box 306, the client application 124 can receive a command from the device services 118 over the network 109. The command can be associated with instructions to perform a migration from a first configuration to a second configuration. The command can be executable by the client device 106 and configured to cause the client device 106 to perform the migration. In one example, the client application 124 checks in with the device services 118 and receives the command from a command queue associated with the client device 106. The client application 124 receives the command, following which the client device 106 executes the command to perform the migration as shown, e.g., in FIGS. 3A and 3B.

At box 309, the client application 124 can determine whether the version of the enterprise environment endpoint 121 has been identified or verified against a supported version. In an instance in which the version has been identified or verified, the process can proceed to box 315. Otherwise, the process can proceed to box 312. At box 312, the client application 124 can transmit a status to the management service 103. Thereafter, the process can proceed to completion.

At box 315, the client application 124 can determine whether at least one of a plurality of data transmission (DT) capabilities of the client device 106 (including the client application 124) has been disabled. Some DT capabilities may interfere or affect the migration. In one example, to disable the DT capabilities can include causing the client application 124 to refrain from initiating a communication with the devices services 118 that could result in the client application 124 downloading any additional commands.

The client application 124 can store a plurality of preserved settings 158 associated with a data communication of the client device 106 over the network 109. The preserved settings 158 can include WiFi settings, Virtual Private Network (VPN) settings, proxy settings, WiFi credentials or other credentials, certificates, single sign-on profiles, email profiles, or other profiles, settings, or attributes that facilitate the use of the client device within the enterprise.

In an instance in which it is determined that the at least one of the DT capabilities has been disabled, the process can proceed to box 321. Otherwise, the process can proceed to box 318. At box 318, the client application 124 can enable the DT capabilities of the client device 106 which were disabled (or attempted to be disabled) at box 315.

At box 321, the client application 124 can determine whether a plurality of device profiles 155 associated with the first configuration (e.g., Android® Device Admin) have been marked for removal. The client application 124 can also initiate removal or mark profiles for removal by setting a particular status such as "STTS_PROFILE_REMOVED_FOR_MIGRATION" for the device profiles 155 associated with the first configuration to initiate removal of the device profiles 155. In an instance in which it is determined that the device profiles 155 have been marked for removal, the process can proceed to box 324. Otherwise, the process can proceed to box 318. At box 318, the client application 124 can enable the DT capabilities of the client device 106 which were disabled at box 315.

At box 324, the client application 124 can determine whether the migration interface 121 has been executed. In an instance in which the client application 124 determines that the migration interface 127 has been executed, the process can proceed to box 330 (FIG. 3B).

Otherwise, the process can proceed to box 327. At box 327, the client application 124 can reapply any of the device profiles 155 marked at box 321, so that the client device 106 can be locally managed by the client application 124 or remotely managed by the management service 103 according to the first configuration. In some examples, the client application 124 can enable the data communication of the client device 106 by applying the plurality of preserved settings 158 as settings on the client device 106. Thereafter, the process can proceed to box 318 to enable the DT capabilities of the client device 106 which were disabled at box 315, and box 312 to transmit a status to the management service 103.

At box 330, the client application 124 can initiate a registration of a user account with the enterprise environment endpoint 121 according to the second configuration. At box 333, the client application 124 can determine whether the registration is successful.

In an instance in which it is determined that at least one of: execution of the migration interface 127, at box 327, or the registration at box 330 was successful, the process can proceed to box 336. Otherwise, the process can proceed to box 339.

At box 336, the client application 124 can remove or delete the plurality of device profiles 155 associated with the first configuration. For example, any devices profiles 155 that have been marked or which are associated with a particular status can be deleted from the client device 106.

At box 342, the client application 124 can enable any of the plurality of data transmission capabilities of the client device 106 which may have been disabled for the migration. In some examples, the client application 124 can enable the data communication of the client device 106 by applying the plurality of preserved settings 158 as settings on the client device.

At box 345, the client application 124 can transmit a status (e.g., "Migration Success") to the management service 103. At box 348, the client application 124 can initiate a communication with the device services 118 to synchronize the device profiles 155, the policies 142, products, or applications for the second configuration. Thereafter, the process can proceed to completion.

Returning to box 339, the client application 124 can determine at least one remedial action to perform following an unsuccessful migration to the second configuration. The client application 124 can for example render a user interface element comprising an indication of the at least one remedial action on the user interface 131, and obtain a selection based at least in part on the user interface element. Remedial actions can include a retry of the registration, a device wipe of the client device 106, or other suitable action which can be performed following an unsuccessful migration to the second configuration.

At box 351, the client application 124 can determine whether the remedial action is the retry of the registration. If the remedial action is the retry, the client application 124 can retry the registration automatically after a predefined amount of time has elapsed (e.g., 2 minutes). The client application 124 can also retry the registration a predefined number of times (e.g., 5 times). In some examples, the client application 124 can determine that the remedial action is at least one of: the device wipe or the retry based at least in part on the selection provided to the user interface 131.

At box 354, the client application 124 can initiate the device wipe of the client device 106. The client application 124 can erase some or all content and/or applications from the client device 106 (e.g., perform a partial or total "device wipe") and/or to disable certain functions of the computing device and/or its applications. The client application 124 can also transmit a status to the management service 103 to indicate that the client device 106 has been unenrolled as a managed device. Thereafter, the process can proceed to completion.

Figure 4:
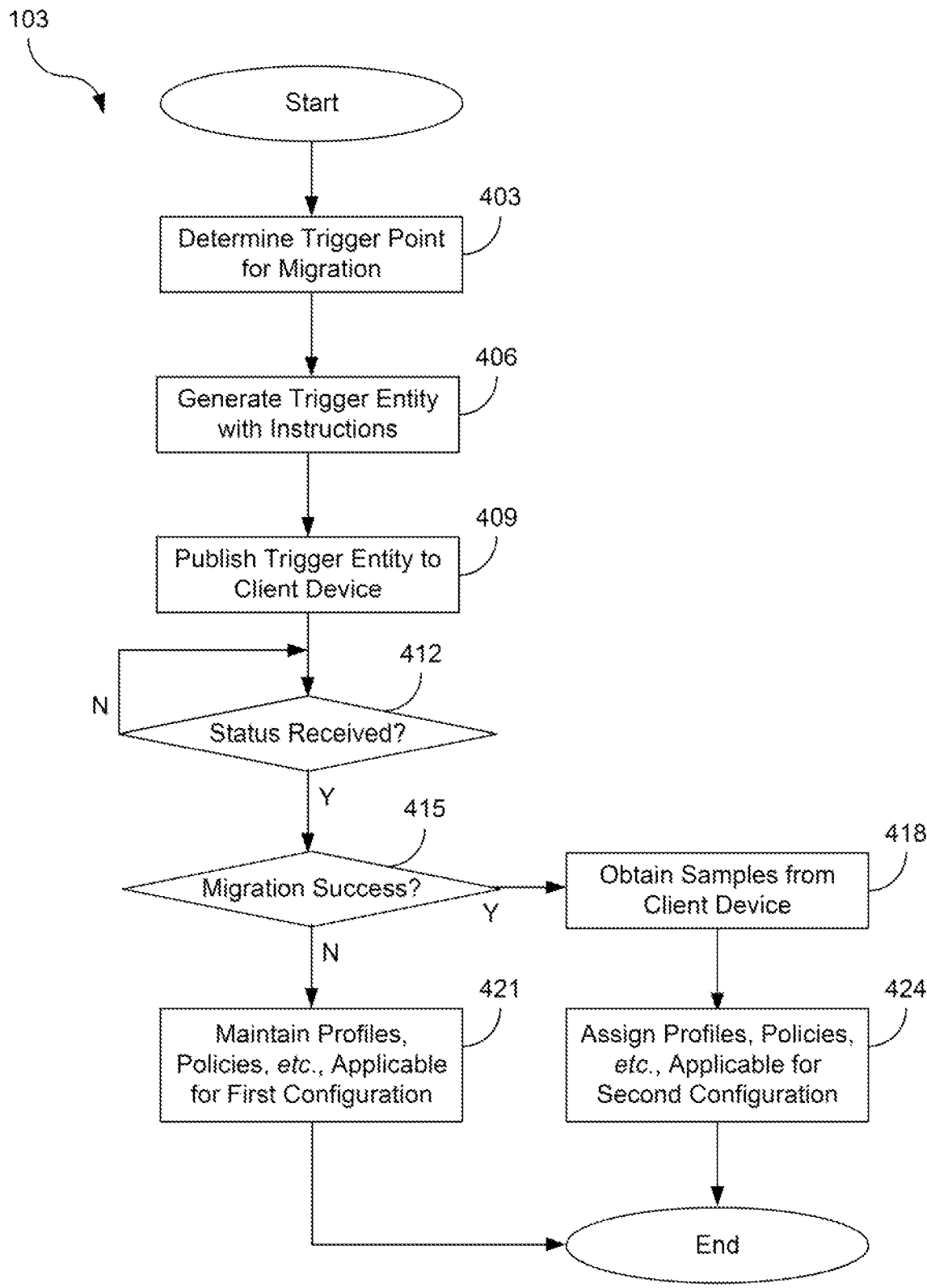
FIG. 4 is a flowchart illustrating one example of the functionality provided by a management service as executed in the network environment of FIG. 1.

FIG. 4 is a flowchart illustrating one example of the functionality provided by the management service 103 as executed in the network environment 100 of FIG. 1. At box 403, the management service 103 can determine a trigger point for a migration to a particular configuration of a deployment model. The management service 103 can receive a capability status from a client device 106 that indicates that the client device 106 (or the client application 124) is capable to perform the migration to the particular configuration.

At box 406, the management service 103 can generate a trigger entity based at least in part on trigger data 139 associated with at least one of: client device data 136 for the client device 106, the particular configuration, or the capability status. In some examples, the management application 115 of the management service 103 can generate the console 116 or other user interface to obtain a selection of a user interface element from an administrator user. The management application 115 can determine, based at least in part on the selection, to generate the trigger entity and/or to publish the trigger entity to the client device 106. In some examples, the management service 103 generates the trigger entity as a command, a Quick Response (QR) code, or a file associated with an Android® intent.

At step 409, the management service 103 can publish the trigger entity to the client device 106. For example, the management service 103 can publish the trigger entity via the device services 118.

At box 412, the management service 103 can determine whether a status has been received for the migration to the particular configuration. The management service 103 can receive the status from the client device 106. If the status has been received, the process can proceed to box 415. Otherwise the process can proceed to box 412. Or, the process can proceed to completion.

At box 415, the management service 103 can determine whether the status indicates that the migration was successful. If the migration was successful, the process can proceed to box 418. Otherwise, the process can proceed to box 421. At box 421, the management service 103 can maintain the device profiles 155, the policies 142, products, or applications for the first configuration suitable for the client device 106 to be locally managed by the client application 124 or remotely managed by the management service 103. Thereafter, the process can proceed to completion.

At box 418, the management service 103 can obtain samples from the client device 106. The samples can be associated with data about hardware and software attributes of the client device 106 that allow the client device 106 to be locally managed by the client application 124 or remotely managed by the management service 103 according to the device profiles 155 and the second configuration (e.g., Android® Enterprise Work Managed mode). The device profiles 155 can be updated based for example on the samples from the client device 106.

At step 424, the management service 103 can assign the device profiles 155 applicable to the second configuration to the client device 106. The management service 103 can store or transmit a command that causes the client application 124 of the client device 106 to retrieve the device profiles 155. In this way, the client application 124 can locally manage the policies 129 associated with capabilities or behaviors of the client device 106 available to manage via the second configuration. Thereafter, the process can proceed to completion.

A number of software components are stored in the memory of a computing device and are executable by a processor. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory including random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory can include both volatile and nonvolatile memory and data storage components. Volatile components are those that do not retain data values upon loss of power. Nonvolatile components are those that retain data upon a loss of power. Thus, the memory can comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise static random access memory (SRAM), dynamic random access memory (DRAM), or magnetic random access memory (MRAM) and other such devices. The ROM can comprise a programmable read-only memory (PROM), an erasable programmable read-only memory (EPROM), an electrically erasable programmable read-only memory (EEPROM), or other like memory device. Also, the processor can represent multiple processors and/or multiple processor cores and the memory can represent multiple memories that operate in parallel processing circuits, respectively.

The non-transitory computer-readable medium embodying program instructions can represent any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Although the applications or services described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Although the flowcharts show a specific order of execution, it is understood that the order of execution can differ from that which is depicted. For example, the order of execution of two or more blocks can be scrambled relative to the order shown. Also, two or more blocks shown in succession in the flowcharts can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A system, comprising:
   a client device that is managed according to device profiles of the client device stored in the client device;
   a client application that, when executed by the client device, causes the client device to carry out a method of migrating a mode of managing the client device from a management service from a first mode to a second mode, said method comprising:
   transmitting a capability status to the management service in an instance in which a plurality of device conditions of the client device are validated to be compatible with the second mode;

in response to an instruction to perform the migration from the first mode to the second mode, disabling functions of the client device in view of the migration and executing a migration interface on the client device to convert the client device from a first configuration for the first mode to a second configuration for the second mode;

determining whether execution of the migration interface was successful; and in response to determining that the execution of the migration interface was successful, enabling the functions disabled in view of the migration, deleting device profiles associated with the first configuration stored in the client device, retrieving device profiles associated with the second configuration, and storing the device profiles associated with the second configuration in the client device.

2. The system of claim 1, wherein the capability status comprises:

a key value pair that indicates the client device is eligible for the migration.

3. The system of claim 1, wherein the plurality of device conditions of the client device, which can be transmitted to the management service, comprises:

a version of an operating system or a platform of the client device, a battery status, a version of the client application, an identifier of the migration interface, and a lack of presence of a type of a user account on the client device.

4. The system of claim 1, wherein the instruction comprises trigger data comprising at least one of: a migration certificate, a resource identifier of the migration interface, application information, migration event information, or a locator of the enterprise environment endpoint.

5. The system of claim 1, wherein the instruction is retrieved from a command queue of the management service.

6. The system of claim 1, wherein the instruction is retrieved in an instance in which a Quick Response (QR) code is captured.

7. The system of claim 1, wherein the instruction is provided via a file comprising an indication of a migration intent associated with the migration interface.

8. A method of migrating a mode of managing a client device from a management service from a first mode to a second mode, wherein the client device is managed by the management service according to device profiles of the client device stored in the client device, comprising:

transmitting, by the client device, a capability status to the management service in an instance in which a plurality of device conditions of the client device are validated to be compatible with the second mode;

in response to an instruction to perform the migration from the first mode to the second mode, disabling functions of the client device in view of the migration and executing a migration interface on the client device to convert the client device from a first configuration for the first mode to a second configuration for the second mode;

determining whether execution of the migration interface was successful; and in response to determining that the execution of the migration interface was successful, enabling the functions disabled in view of the migration, deleting device profiles associated with the first configuration stored in the client device, retrieving device profiles associated with the second configuration, and storing the device profiles associated with the second configuration in the client device.

9. The method of claim 8, wherein the capability status comprises:

a key value pair that indicates the client device is eligible for the migration.

10. The method of claim 8, wherein the plurality of device conditions of the client device, which can be transmitted to the management service, comprises:

a version of an operating system or a platform of the client device, a battery status, an identifier of the migration interface, and a lack of presence of a type of a user account on the client device.

11. The method of claim 8, wherein the instruction comprises trigger data comprising at least one of: a migration certificate, a resource identifier of the migration interface, migration event information, or a locator of the enterprise environment endpoint.

12. The method of claim 8, wherein the instruction is retrieved from a command queue of the management service.

13. The method of claim 8, wherein the instruction is retrieved in an instance in which a Quick Response (QR) code is captured.

14. The method of claim 8, wherein the instruction is provided via a file comprising an indication of a migration intent associated with the migration interface.

15. A non-transitory computer-readable medium embodying program instructions executable in a client device that, when executed by the client device, cause the client device to carry out a method of migrating a mode of managing the client device from a management service from a first mode to a second mode, wherein the client device is managed by the management service according to device profiles of the client device stored in the client device, said method comprising:

transmitting a capability status to the management service in an instance in which a plurality of device conditions of the client device are validated to be compatible with the second mode;

in response to an instruction to perform the migration from the first mode to the second mode, disabling functions of the client device in view of the migration and executing a migration interface on the client device to convert the client device from a first configuration for the first mode to a second configuration for the second mode;

determining whether execution of the migration interface was successful; and in response to determining that the execution of the migration interface was successful, enabling the functions disabled in view of the migration, deleting device profiles associated with the first configuration stored in the client device, retrieving device profiles associated with the second configuration, and storing the device profiles associated with the second configuration in the client device.

16. The non-transitory computer-readable medium of claim 15, wherein the capability status comprises:

a key value pair that indicates the client device is eligible for the migration.

17. The non-transitory computer-readable medium of claim 15, wherein the plurality of device conditions of the client device, which can be transmitted to the management service, comprises:

a version of an operating system or a platform of the client device, a battery status, an identifier of the migration interface, and a lack of presence of a type of a user account on the client device.

18. The non-transitory computer-readable medium of claim 15, wherein the instruction comprises trigger data comprising at least one of: a migration certificate, a resource identifier of the migration interface, migration event information, or a locator of the enterprise environment endpoint.

19. The non-transitory computer-readable medium of claim 15, wherein the instruction is retrieved from a command queue of the management service.

20. The non-transitory computer-readable medium of claim 15, wherein the instruction is provided via a file comprising an indication of a migration intent associated with the migration interface.

* * * * *